US005600143A

United States Patent [19]
Roberts et al.

[11] Patent Number: 5,600,143
[45] Date of Patent: Feb. 4, 1997

[54] SENSOR INCLUDING AN ARRAY OF SENSOR ELEMENTS AND CIRCUITRY FOR INDIVIDUALLY ADAPTING THE SENSOR ELEMENTS

[75] Inventors: Peter C. T. Roberts, Gilbert, Ariz.; Charles F. Walmsley, Edinburgh, Scotland

[73] Assignee: Litton Systems, Inc., Woodland Hills, Calif.

[21] Appl. No.: 348,590

[22] Filed: Dec. 2, 1994

[51] Int. Cl.⁶ .................................. H04N 5/33; G01J 5/30
[52] U.S. Cl. .................. 250/349; 250/332; 250/338.1; 250/338.4
[58] Field of Search .................... 250/332, 338.1, 250/338.4, 349

[56] References Cited

U.S. PATENT DOCUMENTS 5,144,133  9/1992  Dudley et al. ........................ 250/332
5,262,871  11/1993  Wilder et al. ........................ 348/307

Primary Examiner—Carolyn E. Fields
Attorney, Agent, or Firm—Poms, Smith, Lande & Rose

[57] ABSTRACT

An infrared sensor includes a linear array of plural photoconductive sensor elements, and a similarly linear multiplexing circuit arranged in side-by-side relation with the linear array of sensor elements. The multiplexing circuit includes a matching plurality of signal input ports, and a wirebond of plural conductors substantially in parallel conducts signals from the plural sensor elements of the array to the respective signal input ports of the multiplexer circuit. The multiplexer circuit includes a matching plurality of adaptation circuits or cells interposed between the respective sensor elements of the array and the input ports of the multiplexing circuit. Each adaptation cell includes a multi-position switch which by its position varies the transfer function of a feed back circuit of the adaptation cell. Plural modes of signal processing for each individual sensor element of the array are provided according to the positions of the multi-position switches of the plural adaptation cells. The sensor includes a microprocessor which allows each sensor element of the array to be operated in a selected one of the plural modes of operation according to the position of the multi-position switch commanded by the microprocessor.

19 Claims, 3 Drawing Sheets

SENSOR INCLUDING AN ARRAY OF SENSOR ELEMENTS AND CIRCUITRY FOR INDIVIDUALLY ADAPTING THE SENSOR ELEMENTS

CROSS REFERENCE TO RELATED APPLICATIONS

The invention of this application is related to technology presented in U.S. application Ser. Nos. 08/283,314, filed 29 Jul. 1994, and 08/190,671, filed 31 Jan. 1994, now U.S. Pat. No. 5,453,618, both of which are also assigned to the same assignee as this application.

BACKGROUND OF THE INVENTION

1. Field of the Invention

The present invention is in the field of sensors. That is, the present invention relates to sensors which provide an electrical output signal in response to an input of another type. The input may be in the form of light, or other electromagnetic radiation. The electrical output response of the sensor may be used to provide an indication of the existence of an input source, of the direction of the source relative to the sensor, or to image the source, for example.

Such a sensor according to the invention further includes a self-adapting sensing circuit. A feature of the self-adapting sensing circuit allows the sensor to operate in any one of several modes. That is, in the operation of such sensors, it is frequently desirable on the one hand to compare the signal provided by a sensor element of the sensor to either an average of the signals provided by the sensor as a whole, or by the particular sensor element over a period of time. Thus, the output signal provided by the sensor is "time averaged", and features of the input source which change with a time interval in a range shorter than a certain maximum interval and longer than a determined minimum interval, each associated with a certain minimum and maximum response frequency for the sensor, are detected. That is, input source features which are changing with time within a selected range of frequencies or time intervals of change, are detected by the sensor.

On the other hand, it may be desirable to compare the output signal of a sensor element to its own immediately preceding output signal in order to provide an output signal indicative of the difference in these signals. This comparison and output signal provision effectively provides a pseudo-radiometric output for a sensor responding to photons of light. The output signal of the sensor is indicative of changes in the input source without reference to the frequency, time interval, or time rate of change of the level or value of the input source, but with reference to a predetermined (known or unknown) value.

Alternatively, it may be desirable to provide such a sensor with an output which is referenced to an externally-provided value. That is, in the case of sensors responding to infrared light, it may be desirable to reference the output of the sensor to a level of infrared photons, such as from a black body source at a set temperature, for example. Such a sensor provides a calibrated output which is radiometric in the sense that the output signal from the sensor is proportionate to the incident infrared light flux according to a proportionality based on the temperature of the reference black body source.

Still more particularly, the present invention relates to such a sensor which is photoconductively responsive to infrared light, and which includes an array of individual sensor elements which are individually adaptive. The sensor may be either of a linear-array or of a two-dimensional array type, and may be a fully staring sensor which does not require a chopper or any other moving parts, for example.

2. Related Technology

Conventional photoconductive sensors generally include an array of sensor elements, each of which provides its own individual response to the particular portion of the input infrared light which falls upon a particular sensor element. The individual electrical outputs of the sensor elements are conducted outwardly of the sensor in order to provide an indication of existence, direction, or image information for the source of infrared light, for example. The sensor may include either a linear array of such sensor elements, or a two-dimensional array of sensor elements. When a linear array of sensor elements is used, the usual sensor system includes a scanner or other such device to scan various parts of the input across the linear array so that all parts of the "scene" (or field of interest within which input sources may be found), scan across the linear array of sensor elements. Alternatively, relative movement of the sensor or source may be used to effect relative movement of portions of the "scene" across the sensor.

Further, conventional focal plane array imaging devices (both for visible light, and for other portions of the electromagnetic spectrum, such as for the invisible infrared portion of the spectrum) have been known for some time. These devices are generally of the charge-coupled type or of the direct-injection type. For purposes of convenience and simplicity in description hereinafter, the term "light" or "light-responsive", and other such terms, should be understood to refer to the electromagnetic spectrum in general, and may include both infrared, and ultra-violet radiations, and other wavelengths in addition to visible light. The known conventional focal plane array imaging devices currently are fabricated as arrays of light-responsive elements, or pixels, in the form of thin-film devices generally in a rectangular array of photo-responsive receptors on the face of a semiconductor substrate. The devices are fabricated using conventional CMOS, thin-film, and other currently-known semiconductor fabrication techniques.

Other conventional infrared or thermal imagers use "room temperature" or near room temperature, ferrielectric sensors, which may be fabricated of barium strontium titanate (BST), for example. Another conventional infrared sensor uses a thin-film bolometer fabricated as a current-mode monolithic array. Such BST or bolometer sensors are considerably more expensive to make than are photoconductive infrared sensors. However, prior to the present invention, photoconductive infrared sensors could not generally provide a level of sensitivity and performance favorably comparable to sensors using the more expensive technologies. Circuit techniques to improve the performance of the photoconductive sensors could not be implemented at a small enough size to be packaged with the sensor in a thermal enclosure. If the performance enhancing circuits were implemented outside of the thermal enclosure, a large number of conductors were required to penetrate the thermal enclosure between ambient and the chilled sensor. Each of these electrical conductors also represented a thermal conductor which allowed ambient heat to leak into the thermal enclosure. The cooling requirements of such a sensor could either rule out the possibility of properly cooling the sensor to its optimum response temperature, or would require a prohibitively large expenditure of power to achieve this level of cooling despite the comparatively large heat leakage into the thermal enclosure along the multitude of conductors.

Importantly, known conventional imaging devices of the focal plane array type are based on an architecture which requires the pixels of the device to be accessed in serial order. That is, the image signal from the pixels is fed out of the imaging device as an analogue or digital data stream representing light levels incident on the pixels individually in a row-by-row scan of the array. Generally this scan starts at one corner of the rectangular array and proceeds across the row of pixels individually, preceding subsequently across the next or adjacent row of pixels. Of course, scanning every other row of the array with the scan rate being such that two such partial scans of alternate rows are completed in the same time as would be required for a complete scan of adjacent rows is also known to reduce the flicker of a video image (interlacing). With either type of scanning, this type of serial image output signal indicative of a pixel scan is long-familiar from the television technology.

Unfortunately, when it is desired to foveate, or to concentrate attention on a stationary or moving image which resides in a particular part of the image array and occupies a comparatively small portion of the array, a large part of the serial information in the signal stream is of little or no interest. That is, after the last portion of the serial signal stream which includes information about an image of interest is received, almost the entire remaining portion of the array scan (or scan of interlacing alternate rows) must be completed before the scan will return to the area of the array which is of particular interest. Thus, time is lost in acquiring image information from the part of the array which is of most interest. This time loss is the case even is signal acquisition circuitry is employed to acquire and concentrate attention on (i.e., create a window of image out of) the array signal stream.

Similarly, when it is desired to acquire an image of an image source which is fast-moving, for example, then the time lost in scanning the entire array, including those areas of the array where image information of little or no interest is located, is a great detriment. This time loss can result, for example, in loss of the image source from the field of view of the imaging system, in confusion of background noise sources for the image source of interest, or both.

One conventional expedient is to simply increase the scanning rate at which the pixels of an imaging device are accessed. This increase of scanning rate results in the scan returning to the area of the array which is of interest more quickly and with less loss of time between scans of the interesting area of the sensor array. However, when the image to be generated is digitized, the analogue-to-digital converters (digitizers) themselves have a finite settling time which limits the rate at which the array can be scanned. The conventional solution to this lack of speed in array scanning is to use plural digitizers in parallel. In this architecture, each of the plural digitizers in sequence is supplied with a portion of the analogue data stream, and is then interrogated for its portion of the resulting digital signal after the digitizer has had time to settle. With multiple digitizers sharing the load, doubling the scanning speed requires double the number of digitizers. Of course, it is easily seen that this conventional expedient itself has limitations with respect to the cost and complexity of the overall imaging system. As the rate of pixel scanning increases, the number of digitizers required becomes prohibitive.

Another conventional expedient is known in accord with U.S. Pat. No. 5,262,871, issued 16 November 1993, to Joseph Wilder, et al. The '871 patent is believed to disclose a two-dimensional focal plane array sensor in which individual pixels or super pixels (groups of individual pixels) of the array can be accessed individually for their output response. This teaching allows the output signals of pixels on the array which are of interest to be obtained, which skipping the outputs of pixels having output (image) information which is of lesser or of no interest at a particular time. Understandably, the time required to complete a scan of the array is significantly shorter when only part of the pixels are interrogated for their output information, when pixels are grouped into super pixels for which averaged output information is obtained, or both.

The '871 patent illustrates another aspect of conventional technology, and an aspect which limits the utility of this technology. In order to provide the electrical output signals from an array of sensor elements to external signal processing circuitry, the sensor taught by Wilder uses a "signal read out section" (or multiplexer) to provide a serial stream of output signals to the external circuitry for further processing. The pixels of the array use a photodiode type of photon sensor which is actually the sensor element of each pixel. These pixels are accessed individually or in groups in order to obtain their individual or a group-average output signal. However, the output signals themselves are received by the "signal read out section", or output multiplexer via an input port or connection which receives a serial stream of output signals from the selected sequential ones or from all of the pixels in a particular row of the sensor sequentially, for example. The input port does not discriminate between individual pixels of the multiple pixels served by a particular signal input port, other than to attribute the input signal received to a particular pixel whose address has been interrogated. So far as adapting the signal input port for individual differences in the pixels of the array, the '871 device does not have this capability. Also, the device of the '871 patent does not provide for individually different processing of input signals from the pixels served by an input port and which are received sequentially. Accordingly, all of the pixels from which an output signal is provided into the output multiplexer via a particular port or connection, and in fact, all of the pixels of the sensor, are treated equally and as equals so far as signal processing (i.e., application of a bias current level or voltage, for example) is concerned. Accordingly, the sensor of the '871 patent cannot implement the alternative modes of signal processing outlined above.

SUMMARY OF THE INVENTION

In view of the above, the present invention has as a primary object the provision of a sensor which allows all individual sensor elements of the sensor to be treated as individuals in the receipt of, and in the application of an adapting bias or offset voltage or current signal to, an output signal from the individual sensor elements of the sensor.

Another object of the present invention is to provide an infrared sensor which employs a sensor element array.

A further objective of the present invention is to provide such an infrared sensor which employs a photo-conductive sensor element.

Such a sensor may be provided according to another object of the present invention by the use of a lead selenide (PbSe) photoconductive sensor element.

Still another object of the present invention is to provide such a sensor which includes an output multiplexer with plural signal input ports and with such an individual adaptation circuit serving each input port of the multiplexer and allowing adaptation to be effected for each individual sensor element of the sensor, while providing a compact and efficient arrangement of the sensor.

Yet another object of the present invention is to provide such a sensor in which the adaptation of the individual output signals of the various sensor elements of the sensor allows any one of plural signal processing modes to be implemented at any one of the sensor elements.

An additional object for the present invention is to provide such a multiplexer with individual input port adaptation circuits to be implemented as a fine-dimension scale comparable with the fine-dimension scale of the sensor elements of the sensor.

Still further, an object for this invention is to provide such a sensor with a fine-dimension multiplexer having individual adaptation circuits at the multiple input ports of the multiplexer, and in which the combination of sensor and multiplexer are of such fine-dimension scale that both can be housed in a thermal housing of sufficiently small size that the sensor can be cooled with a small energy expenditure.

Additionally, an object for this invention is to provide such a sensor in which the number of electrical (and thermal) conductors penetrating the thermal enclosure is minimal.

Accordingly, the present invention provides according to one aspect thereof an infrared sensor comprising a photo-conductive infrared sensor element varying in conductivity in response both to temperature (thermic variation) and to incident infrared light (photonic variation); an adaptation circuit conducting a variable bias current from a source thereof through the sensor element, the adaptation circuit including a resistive element in parallel with a variable-conductance element. The variable-conductance element varying in conductivity in response to a feed back signal to provide a portion of the bias current flow resulting form thermic variation of conductivity of the sensor element, and the resistive element providing a portion of the bias current resulting from photonic variation of conductivity of the sensor element. The resistive element also providing a first feed back signal in response to voltage drop across the resistive element.

The above and additional objects and advantages of the present imaging device will appear from a reading of the following description of a particularly preferred exemplary embodiment of the invention taken in conjunction with the following drawing Figures.

Advantages of the present invention derive from its use of thermoelectric cooling, as opposed to using a more complex and limited cryostat, cryocooler, cryoprobe, or cryogenic liquid cooling; from its simplified construction having an infrared sensor, and multiplexer for signal output both carried on a thermoelectric cooler, all within a compact thermal housing. Additional advantages of the present sensor follow from its use of comparatively low-cost lead-selenide (PbSe) sensor elements. These sensor elements are formed of photo-conductive material, which conventionally has imposed performance limitations upon sensors heretofore using this sensor material. However, the present invention substantially overcomes all of the limitations in performance of conventional sensors. The present invention thus provides an economical infrared sensor of low cost, rugged construction, and good performance (especially when considered on a performance versus cost basis), which is suitable for use a variety of industrial and air-borne environments.

BRIEF DESCRIPTION OF THE DRAWING FIGURES

FIG. 1 is a perspective view of the sensor, thermal enclosure, multiplexers, and other circuitry and connection features embodying the sensor of the present invention;

FIG. 2 provides an enlarged fragmentary cross sectional view of a portion of FIG. 1, and shows a sensor, thermoelectric cooler, thermal enclosure, and multiplexers, with associated connection features and circuitry of the sensor embodying the present invention;

FIG. 3 provides a plan view of the sensor seen in FIGS. 1 and 2;

FIG. 4 provides an enlarged fragmentary plan view of a section of the sensor portion of the scanner seen in FIGS. 1-3;

FIG. 5 schematically depicts multiple input cells which are associated one with each one of the multiple input ports of a multiplexer of the sensor, and particularly illustrates a typical one of these cells.

DESCRIPTION OF A PREFERRED EMBODIMENT OF THE INVENTION

Figure 1:
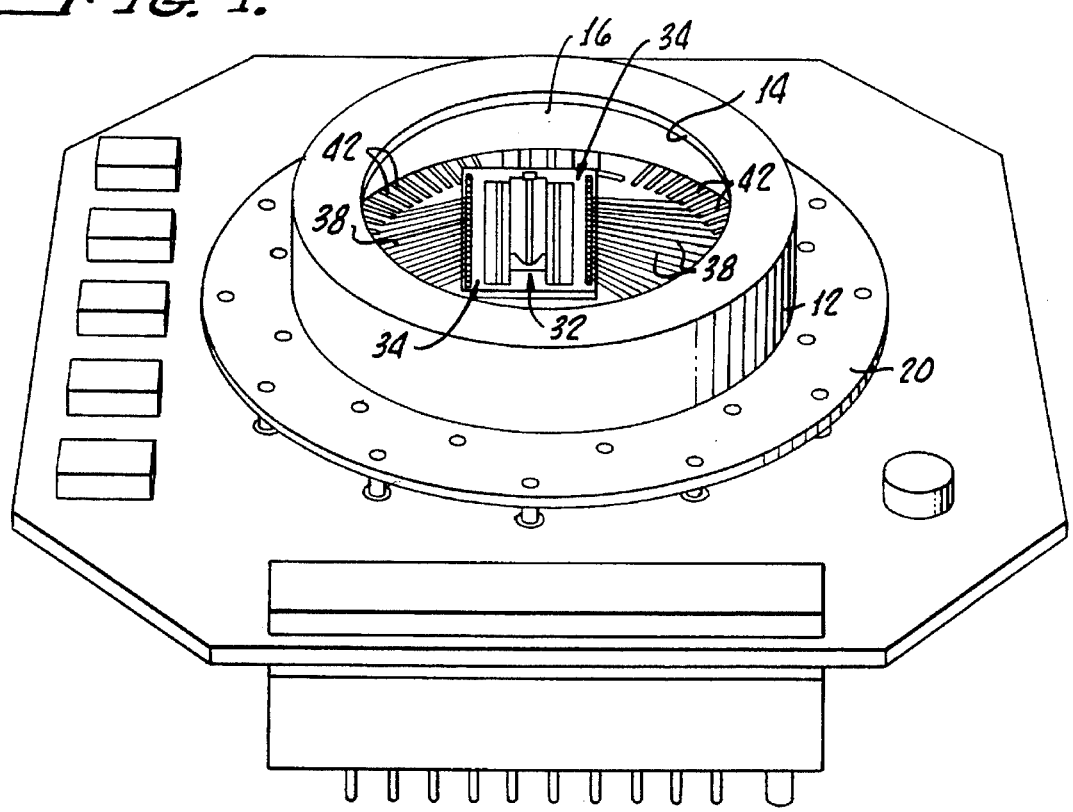
Figure 2:
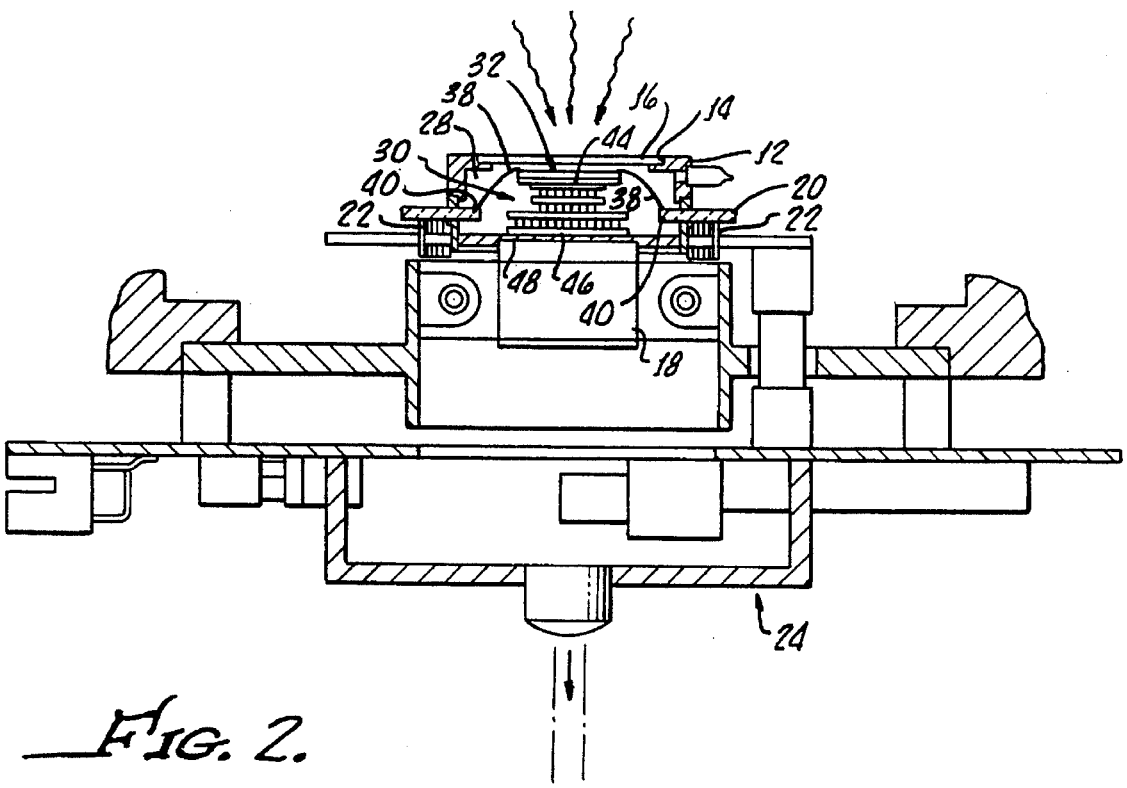

Considering now FIGS. 1-4 in conjunction, with attention first to FIGS. 1 and 2, a sensor module 10 is shown in perspective and in elevational cross section. The sensor module 10 includes a thermally-insulative housing 12, which upwardly defines an opening 14 into which is sealingly received a window member 16. This window member is transparent to infrared radiation, but may or may not be opaque to visible light. For purposes of illustration, the window 16 is depicted as though it were transparent to visible light. In an actual embodiment of the sensor module 10, a person may not be able to view the internal structures of the module 10 through the window 16, dependent upon whether this window is transparent to visible light. Downwardly from the housing 14 depends a heat sink mass 18. For example, the mass 18 may be formed of beryllium oxide. Circumferentially around the housing 12, the sensor module 10 includes an outwardly extending flange portion 20, on which is carried plural depending electrical contact pins 22. The flange portion 20 sets upon a circuit board 24, and the thermal mass 18 is received into a recess or opening 26 of this circuit board. The pins 22 provide electrical interface of the sensor module 10 with the circuit board 24.

The housing 12 sealingly encloses an evacuated chamber 28 within which is received upon a three-stage thermoelectric cooler 30, both a photo-conductive lead selenide (PbSe) sensor-array chip 32 and a pair of multiplexing circuit chips 34. The multiplexing circuit chips 34 flank the sensor-array chip 32. A pair of respective wire bonds 36, each of multiple conductors, extends laterally between the sensor-array chip 32 and each of the multiplexing chips 34. Also, a plurality of conductors 38 extend from the multiplexing circuit chips outwardly to an annular ceramic feed-through portion 40 of the housing 12, viewing FIG. 3. Inwardly of the chamber 28, the ceramic feed-through portion 40 defines plural metallic electrical contact pads 42, to which the conductors 38 are respectively connected individually. Outwardly of the housing 12, the ceramic feed-through portion 40 of the housing defines the flange 20, and carries the depending contact pins 22 in electrical connection individually with the contact pads 42. Within the ceramic feed-through portion 40, the contact pads 42 are individually connected electrically to respective ones of the contact pins 22.

The thermoelectric cooler 30 includes three cascaded or series arranged stages of reversed Peltier-effect cooling semiconductor junctions, which move heat from the upper end of the cooler 30 toward the lower end of this cooler when an appropriate voltage and current flow is provided in the cooler. Consequently, the upper surface 44 of the cooler 30 becomes very cold, and heat is moved to the lower surface 46 of the cooler, warming this lower surface. The lower surface 46 of the cooler 30 is thermally connected to the heat sink mass 18 through the intervening lower wall 48 of the housing 12. Heat sink mass 18 is exposed to the ambient environment around the sensor module 10 (on the side of the circuit board 24 which is opposite to the window 16), and is cooled by air convection and radiation to the environment. Accordingly, heat from the heat sink thermal mass 18 does not warm surrounding structures by convection or radiation to produce unwanted sources of infrared radiation within view of the window 16. At the upper end of the cooler 30, the upper surface 44 is thermally connected to the sensor-array chip 32 via an intervening thermally-conductive synthetic sapphire upper mother board member 50. This upper mother board member 50 also carries the multiplexer circuit chips 34, so that these circuit chips are cooled and operate at a low temperature.

Figure 3:
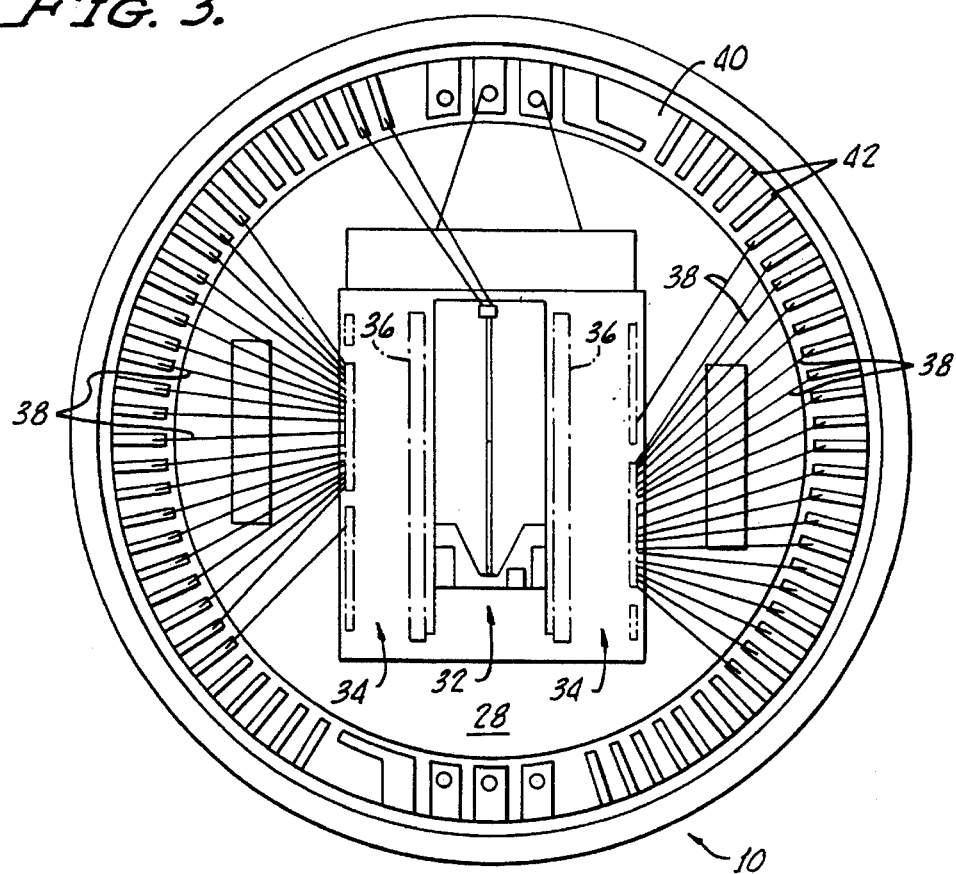
Figure 4:
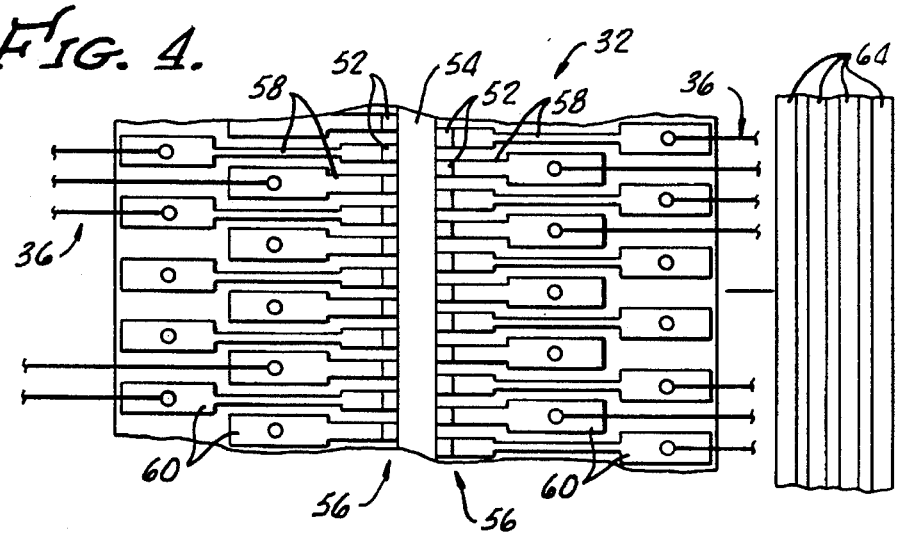

FIG. 4 shows an enlarged fragmentary plan view of a small portion of the sensor-array circuit chip 32 seen in FIG. 3. As is shown on FIG. 4, the sensor-array chip 32 includes a bi-linear array of fine-dimension PbSe photo-conductive sensor elements 52, arrayed on opposite sides of a central conductive metallic trace 54 in two staggered rows 56. This conductive trace 54 has a width of about 0.007 inches, while the sensor elements 52 are about 0.0022 inches square on 0.004 inch centers. These sensor elements 52 are effectively pixels or image elements when the sensor module 10 is used to provide image information about a source of infrared light. Because the sensor elements 52 have a dimension larger than their center-to-center spacing, there is an overlap of about 20 percent between the two rows of these image (sensor) elements 52. In other words, with the two cooperative rows of sensor elements 52, all of the image information which is delivered to the sensor-array chip 32 by an optical system will pass across at least one of the sensor elements 52, and will have an opportunity to produce an electrical photo-conductive response.

Preferably, the sensor-array chip seen in FIG. 4 includes 256 sensor elements 52 arrayed in two closely spaced apart rows 56, each of 128 sensor elements. The sensor-array chip 32 provides about 20 percent image capture redundancy because of overlap of these sensor elements 52. Extending in respectively opposite directions from each of the sensor elements 52 in each of the two sensor rows 56, are respective conductive traces 58 leading individually to respective contact pads 60. The wire bond conductors 36 connect individually at their inner ends to the contact pads 60, and extend to similar contact pads 62 at the multiplexing circuit chips 34. These contact pads 62 at the multiplexing circuit chips 34 are best seen in FIG. 3. The length of the multiplexing chips 34 is favorably comparable to that of the sensor array chip 32. Accordingly, hereafter it will be recognized that the circuit elements of the multiplexer chips 34 are implemented at a fine-dimension scale comparable in size and in pitch (repeat distance along the length of the multiplexer chips 34) similar to the dimensions set out for the array chip itself.

Those ordinarily skilled in the pertinent arts will recognize that a scanner or other such device optically scans a "scene", "view", or field in which an infrared source of interest may be located across the sensor elements 52. This scanning may be achieved, for example, by relatively moving the scene, the sensor 10, or both. Alternatively, neither the scene or the sensor need be relatively moving. An optical scanner device may be used to scan portions of the scene successively across the sensor elements 52 of the sensor 10. On the sensor array chip 32, the successive small viewed portion of the scene changes at the sensor elements 52 in a direction perpendicular to the length of the sensor rows 56 as the scanning is performed. The effect is similar to an observer staring out of a very narrow window of a moving rail road car at the scenery passing by. Such a very narrow window would not provide the observer with a very satisfying view of the scenery. However, if the observer were to take a rapid sequence of narrow photographs, and then were to fit these photos together in sequence, a complete mosaic image of the scenery which had passed the narrow window could be assembled.

Diagrammatically, this scan of an image across sensor-array chip 32 is represented by a plurality of long, narrow sequential image portions (each illustrated with a dashed-line box 64) approaching the sensor elements 52 in FIG. 4, as is represented by the arrow 66. As can be easily envisioned, the image lines 64 adjacent to one another form a mosaic image of a scene, At the sensor elements 52, a bias voltage is applied between the trace 54 and the connector pads 60 so that a bias current always flows through the sensor elements 52. These photoconductive PbSe photoconductive elements 52 becomes more or less conductive both in response to temperature and in response to infrared radiation which is incident upon them in the scene portions 64. The part of the bias current which flows through a sensor element 52 because of temperature will be at least four times the photonic bias current flow. The bias current level through the sensor elements 52 does change significantly in response to the infrared radiation from the scene. However, this photonic change in conductivity is superimposed upon a much greater thermic conductivity, as will be seen. The image information, then, consists of the differences in the levels of current flow between trace 54 and pads 60 as the infrared radiation from the scene sweeps across the sensors 52 in response to movement of the scanning platform 26. However, the total bias current level through a particular sensor element 52 will be at least two orders of magnitude (20) times greater than the signal level. In some instances, the signal to noise ratio may be as low as 1/200,000! These electrical current signals from the sensor elements 52 are passed directly by the wire bond conductors 36 to the associated contact pads of the multiplexing circuit chips 34.

At the multiplexing circuit chips 34, the signals conducted from the individual sensor elements 52 of the sensor-array chip 32 are biased, filtered, and amplified. The voltage at the output of each channel of the multiplexer circuit then represents an electrical analog of the infrared image information contained in a particular image line 64. The voltage levels are then serially transferred by the multiplexer 34 to a common output line (on of the conductors 38) on each of the multiplexing circuit chips 34 by use of a shift register of the multiplexing circuit. This transfer of voltage-level image information from the multiplexer chips 34 takes place at a high speed, and the channels of these multiplexer circuits are prepared to receive and temporarily store image information from the next succeeding image line 64 as the scanning proceeds across the sensor elements 52.

Each of the multiplexing circuit chips 34 then provides a respective serial digital signal containing the image information for the image lines 64. That is, the multiplexers 34 also effect an analog to digital conversion of the image signals. These multiplexing circuit chips 34 are synchronized in their operation so that they serially handle and output the image information from the two rows 56 of sensor elements 52. For example, the multiplexing circuit chips 34 can alternate in their operation so that all of the image information from the sensor elements 52 of one of the rows 56 of sensor elements 52 is fed out serially by the associated one of the multiplexing circuit chips 34, and is followed then by the image information from all of the sensor elements 52 of the other row 56 from the other multiplexing circuit chip 34. This alternating of serial bit streams from each of the two rows of sensor elements 52 would be repeated for each succeeding image line, with a line-synchronizing signal indicating the start or end of each image line's bit stream. Alternatively, the multiplexing circuit chips 34 can alternate in sequentially providing serial portions of the output signal, which serial portions each represent image information from one of the sensor elements, to be followed by image information from the adjacent sensor on the other side of the central conductive trace 54, and so on back and forth in stair-step fashion across the trace 54 and along the length of the bi-linear sensor array chip 32.

Figure 5:
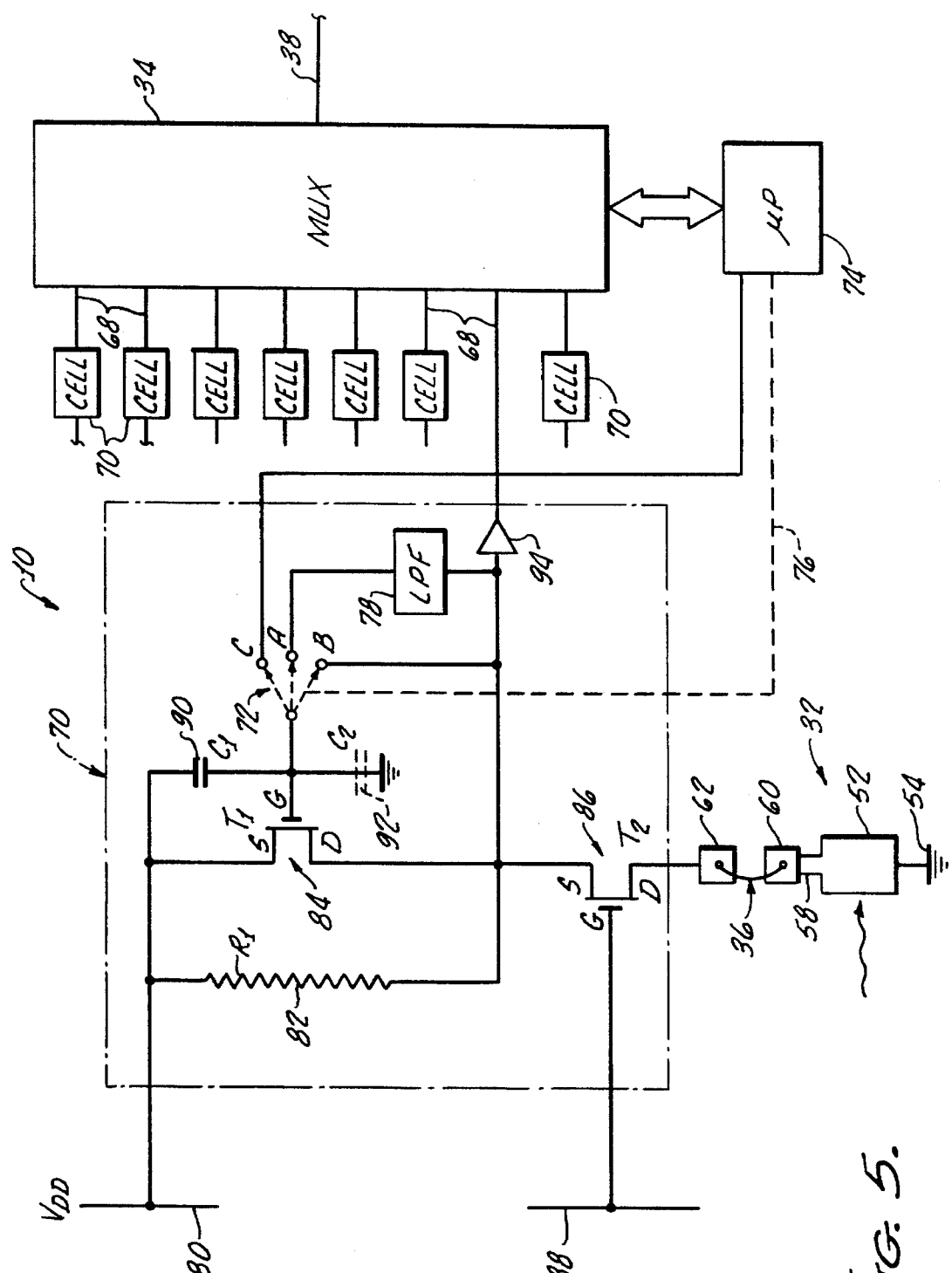

It will be recalled that the image falling on the detector elements 52 causes certain ones of these elements to become more conductive in accord with the level of infrared radiation flux falling on these detector elements. A bias voltage maintained between the conductive trace 54 and the contact pads 60 ensures that a certain level of bias current always flows through the detector elements 52. As these detector elements 52 receive varying levels of infrared radiation from the image volume 22, the level of current flow varies. These current flow levels are representative of the image information, and become the genesis for the various forms of image signals to be produces from these currents. Viewing now FIG. 5, it is seen that each one of the multiplexer chips 34 includes plural signal input ports, which are indicated with the arrows 68. FIG. 5 shows only one of the multiplexer chips 34. Both multiplexer chips 34 have the same interface structure with the sensor array chip 32. FIG. 5 also indicates that the input ports are actually an individual conductor 68' extending to the multiplexer 34 from an individual one of a like plurality of fine-dimension adaptive signal input cells 70. That is, each signal input port 68 of the multiplexer chips 34 has associated with it a typical adaptive signal input cell 70. These cells are implemented at a fine-dimension scale like that of the sensor elements 52, and at a like pitch along the length of the multiplexer chips 34.

FIG. 5 shows that the signal input cells 70 each include a respective three-position switch 72. This switch is not a mechanical switch with a moving switch element, but will be implemented using CMOS technology, and will include several MOSFET transistors. Accordingly, the switch 72 also has an open switch position in which none of the switch positions are closed. The switches 72 of all of the adaptation cells 70 are individually under the control of a microprocessor 74 via an interconnection, which is generally indicated with the dashed line and numeral 76. Cells 70 each also include a low pass filter (LPF) 78. In the "A" position of the switch 72, the low pass filter 78 is interposed in a feed back loop formed as part of the electrical connection of input signals from the cell 70 to the respective input port 68. In the "B" position of the switch 72, the LPF 78 is bypassed so that the feed back loop is not influenced by the frequency of the transmitted output signal, and connection of the output signals directly from the particular sensor element 52 and adaptation cell 70 to the particular input port 68 of the multiplexer 34 is effected. Finally, FIG. 5 also shows that in the "C" position of switch 72, the microprocessor 74 may individually provide a signal to the individual adaptation cells 70.

Those ordinarily skilled in the pertinent arts will recognize that photoconductive elements, like the elements 52 (whether fabricated of PbSe, or other photoconductive material), are semiconductors which depend upon generation and recombination (G-R) of electrons and electron holes for conductivity. That is, in G-R electrons are excited from the valence band to the conduction band by either thermal (thermic) or optical (photonic) excitation. Thermal excitation occurs when an electron absorbs an internal thermal photon, while optical excitation occurs when an electron absorbs an incident external (i.e., infrared) photon. The electrical conductivity of a photoconductor material is proportional to the density of electrons in the conduction band. For most photoconductors, the density of thermally excited electrons in the conduction band is up to three orders of magnitude larger than the density of optically excited electrons. A photoconductive sensor is operated by applying a constant direct-current bias voltage to the sensor and measuring the resulting current flow. Consequently, a measurement of the incident optical flux requires extraction of the much larger thermal current from the much smaller optical current flow. The current flow resulting from the optical excitation of the photoconductive material is then amplified and processed to extract useful information.

Further considering FIG. 5, it is seen that the individual adaptation cells 70 each have a branch connection with a conductor 80 carrying a selected voltage level "$V_{DD}$". From the branch connection with conductor 80, both a resistor "$R_1$", and a transistor $T_1$ (referenced with numerals 82 and 84, respectively), in parallel provide direct current connection between the voltage level $V_{DD}$, and an input control transistor 86. The transistor 86 has a gate connection to a constant bias voltage level $PC_{bias}$, via a conductor 88. The photoconductive sensor element 52 and transistor 86 in series with resistor 82 and transistor 84 (the latter two elements in parallel) are connected between the voltage source $V_{DD}$ and the ground potential at trace 54 (indicated on FIG. 5 with the ground symbol). The gate of transistor 84 has connection to the conductor 80 via a capacitor $C_1$ (referenced with the numeral 90). The switch 72 in both of its positions "A", and "B" closes a feed back loop from the drain of transistor 84 to the gate of this transistor. Transistor 84 also provides a parasitic capacitance $C_2$ to ground potential, which parasitic capacitance (not a physical capacitor), is indicated with the dashed-line capacitor symbol and the numeral 92. Each adaptation cell 70 also includes a gain element 94. The gain elements 94 operate to best advantage with a particular level or range of input signals, which is effected by the feedback loop of the adaptation cell. Also, the gain elements 94 effect an amplification of about twenty for the input signals from each sensor element 52 and cell 70 as these signals are supplied via the gain elements 94 as output signals to the multiplexer 34.

In practice, resistor $R_1$ is provided by a drain-gate connected MOSFET transistor. $C_2$ represents parasitic capacitance on the output signal node (i.e., on conductor 68). In theory, summing the currents at the output node (conductor 68) provides:

$$I_{PC} = I_b + V_{o(s)}(1/R_1 + sC_2)$$

Where $I_{pc}$ is the current flow through the photoconductive sensor element 52, $I_b$ is the bias current flow through the transistor 84, and $V_{o(s)}$ is the voltage level at conductor 68

(i.e., the output signal voltage level supplied to multiplexer 34).

The bias current flow $I_b$ through the transistor 84 as a function of gate voltage applied to transistor 84 is given by:

$$I_b = V_g \cdot g_m$$

Where $g_m$ is the MOSFET transconductance parameter for this transistor, and $V_g$ is the gate voltage applied to the transistor. The gate voltage $V_g$ for transistor 84 is given by:

$$V_g = F_{(s)} \cdot V_{o(s)}$$

Where $F_{(s)}$ is the transfer function of the low-pass filter 78. An example of this transfer function may be:

$$j\omega = \frac{1}{1 + s/\omega_o}$$

Combining these equations gives:

$$V_{o(s)} = I_{pc} \frac{R_1}{1 + sR_1C_p + F_{(s)}R_1 g_m}$$

Approximating this equation and evaluating for low frequency, mid-frequency, and high frequency operation of the sensor gives the following results: At low frequencies, $sR_1C_2$ is very much less than 1, and $F_{(s)}$ equals 1. Thus:

$$V_o \approx I_{pc} \frac{1}{1 + R_1 g_m} \ll 1 \text{ (for } R_1 \gg 1\text{)}$$

At mid-frequencies, $sR_1C_2$ is very much less than 1, and $F_{(s)}$ is equal to or approaches zero. Thus:

$$V_o = I_{pc} R_1$$

At high frequencies, $sR_1C_2$ approaches infinity, and $F_{(s)}$ approaches zero, so the $V_o$ approaches zero.

Thus, the output response of the adaptation cells 70 (and of the sensor 10) will peak at mid-frequencies, and will fall off as required at both low and high frequencies in the "A" position of the switch 72. This mode of operation is provided when the microprocessor 74 causes switch 72 of a particular cell 70 to be in its "A" position so that the LPF 78 is influencing the gate voltage applied to transistor 84 in the feedback loop. This mode is referred to as an "Average", or "AVG", mode of operation because it provides a weighted averaging of the last several scans of the sensor element 52 with successive image portions 64, recalling FIG. 4.

By switching control of the bias current flow through the transistor 84 directly to the $V_{(s)}$ signal (i.e., directly to conductor 68 in switch position "B") during one line scan (i.e., during one image portion 64); and by storing this $V_{(s)}$ result capacitively by subsequently opening switch 72; then all following line scans [i.e., the $V_{(s)}$ output signal results for following image portions 64], will effectively be subtracted from or will represent a difference value over the stored image signal value. That is, the following image portions will be compared to the stored image portion by differencing of the $V_{(s)}$ line scan values so that the output signals provided are functions of the differences between image portions. This mode of operation is referred to as "Last", or "LST", because it uses as a reference for future image portions the last scan of an image portion during which the switch 72 was commanded to a closed position (i.e., position "B").

Further to the above, it will be recognized that due to variations in the process of manufacture, and in the resulting physical structures of the multiplexers 34, adaptation cells 70, and sensor elements 52, the control voltages applied to each transistor 84 of the various adaptation cells 70 are slightly different. In both the "AVG", and "LST", modes of operation, these differences are accommodated adaptively. By commanding switch 72 to the "C" position, the microprocessor 74 may supply a reference calibration voltage level to each individual transistor 84 of each of the various adaptation cells 70. This reference voltage may be different for each of the cells 70 according to the differences among the cells. With each line scan (portion of image 64), the reference control voltage is updated or refreshed to the appropriate value for each adaptation cell. This mode is referred to as "External", or "EXT" mode because it uses as a reference for the sensor elements 52 of sensor 10 an external reference voltage source (i.e., a bias voltage level and bias current flow for each adaptation cell provided by reference to a memory facility of the microprocessor 74).

The particular reference voltage levels required by the sensor elements 52 of sensor 10 can be determined by exposing the sensor to a reference image source (i.e., to a black body radiator at a known temperature) and with switch 72 in position "C", and then causing microprocessor 74 to memorize the resulting $V_{(s)}$ values from each sensor element 52. Thereafter, the memorized voltage level can be used to establish an external precise reference for each individual sensor element 52. In the "EXT" mode of operation, true direct-current radiometric operation of the sensor 10 is possible. That is, the $V_{(s)}$ of the sensor will be proportional to the ratio between the number of photons incident on the sensor at a particular time from the scene being viewed by the sensor and the number of photons provided by the reference source used earlier to establish the individual reference bias levels for the sensor. Those ordinarily skilled in the pertinent arts will recognize that for such radiometric operation, a temperature compensation function will be necessary to compensate for thermal drift. One way to effect this temperature compensation is to provide extra photoconductors 52 on the sensor array chip 32, which elements are shielded from incident photon radiation (and are therefore "blind"). These extra photoconductive elements will also vary in their conductivity in response to thermal drift of the sensor elements, and will provide a temperature compensation mechanism. That is, these extra "blind" photoconductive sensor elements will still be subject to the same level of thermic excitation as the sensor elements which are exposed to the incident light flux. The signal level from these extra sensor elements by its variation provides an indication of temperature variations in the sensor array chip 32, which can then be compensated for electronically within the multiplexer chips 34.

While the present invention has been depicted, described, and is defined with reference to a particularly preferred exemplary embodiment of the invention, such reference does not imply a limitation on the invention, and no such limitation is to be inferred. The invention is capable of considerable modification and variation, as will suggest themselves to those ordinarily skilled it the pertinent arts. The invention is intended to be limited only by the spirit and scope of the appended claims, giving full cognizance to equivalents in all respects.

We claim:

1. A photo-conductive infrared sensor comprising:

an array of sensor elements each varying in conductivity in response both to temperature (thermic variation), and to incident photons of infrared light (photonic variation) which is to be measured;

plural adaptation circuits each individually conducting a variable bias current from a source thereof through the respective one of said plural sensor elements, said adaptation circuits each including a resistive element in parallel with a variable-conductance element, said variable-conductance element varying in conductivity in response to a feed back signal to provide a first portion of said bias current resulting from variation of conductivity of said sensor element in response to thermic variation, said resistive element providing a second portion of said bias current resulting from variation of conductivity of said sensor element in response to said photonic variation, and said resistive element also providing a first signal in response to voltage drop there across, each adaptation circuit including a multi-position switch in one position thereof supplying said first signal to said variable-conductance element as said feed back signal.

2. The sensor of claim 1 wherein said plurality of adaptation circuits each further include a frequency-responsive filter, said frequency-responsive filter receiving said first signal and responsively providing a second signal, said multi-position switch in a second position thereof supplying said second signal to said variable-conductance element as said feed back signal.

3. The sensor of claim 2 wherein said plurality of adaptation circuits each further includes said multi-position switch having a third position, said multi-position switch in said third position thereof supplying a signal from an external conductor to said variable-conductance element as said feed back signal.

4. The sensor of claim 1 wherein said plurality of adaptation circuits each further includes a capacitive charge storage element connected between said switch and said variable-conductance element, said multi-position switch having an open position in which charge from said feed back signal is stored on said capacitive charge storage element.

5. The sensor of claim 1 wherein said sensor further includes a plurality of amplifier elements each respectively receiving said first signal from an individual adaptation circuit, and responsively providing an amplified output signal.

6. The sensor of claim 5 wherein said sensor further includes a multiplexer having a respective plurality of signal input ports, said plurality of adaptation cells individually connecting said output signal therefrom with a respective one of said plurality of signal input ports.

7. An infrared sensor comprising:

an array of photoconductive infrared sensor elements each providing a corresponding one of plural electrical signals indicative of infrared radiation falling thereon;

a multiplexing circuit having a like plurality of signal input ports each receiving a respective one of said plural electrical signals and sequentially connecting corresponding signals to an output conductor; and a like plurality of adaptation input cells each conducting an electrical signal from a respective sensor element of said array to a respective one of said input ports of said multiplexer circuit, each adaptation input cell providing a variably-conductive circuit element conducting a bias current flow through the respective sensor element, and an externally-controllable switch which by its position effects a selective variation in the conductivity of said variably-conductive circuit element.

8. The infrared sensor of claim 7 wherein said infrared sensor includes a linear array of said photoconductive sensor elements, which are disposed at a certain repeat distance along said linear array of sensor elements, said input adaptation cells likewise being disposed at said repeat distance along said multiplexing circuit.

9. The infrared sensor of claim 8 further including a wirebond having plural conductive wires substantially in parallel, said plural conductive wires of said wirebond individually connecting sensor elements of said linear array with respective signal input ports of said multiplexing circuit.

10. An infrared sensor including an adaptation circuit for extracting an output signal from a variably-conductive infrared sensor element, which infrared sensor element varies in conductivity in response both to changes in temperature and in response to an external infrared electromagnetic radiation stimulus which is to be sensed, said adaptation circuit of said infrared sensor comprising:

a resistor, a first transistor, and a capacitor mutually connected in parallel between a source of bias current and said sensor element;

a second transistor connected in series with said sensor element, and with the parallel combination of said resistor, said first transistor and said capacitor between said bias current source and a ground;

a feedback conductor connecting a voltage drop signal from said resistor to a gate of said first transistor and externally of said adaptation circuit as said output signal;

a multiposition switch in a first closed position connecting said voltage drop signal from said resistor to said gate of said first transistor.

11. The infrared sensor of claim 10 wherein said adaptation circuit further includes a low-pass filter receiving said voltage drop signal, said low-pass filter responsively providing a second signal, and said multi-position switch further includes a second closed position in which said second signal is conducted to said gate of said first transistor.

12. The infrared sensor of claim 10 wherein said multi-position switch further includes an open position in which no voltage drop signal is provided to said gate of said first transistor, said first transistor including a virtual capacitance associated with said gate for storing a voltage value of said voltage drop signal supplied thereto while said multi-position switch is closed.

13. The infrared sensor of claim 10 wherein said multi-position switch further includes a third closed position connecting an external conductor of said adaptation circuit to said gate of said first transistor, whereby an external reference voltage level may be applied to said first transistor via said external conductor.

14. The infrared sensor of claim 10 wherein said multi-position switch further includes a command interface allowing said multi-position switch to be placed into any one of its available positions in response to an externally-applied command.

15. A photoconductive infrared sensor comprising:

an array of photoconductive sensor elements each providing a respective output signal in response to infrared light incident thereon;

a multiplexer circuit having a like plurality of signal input ports;

a like plurality of adaptation cell circuits connecting individual output signals from respective sensor elements of said plurality of sensor elements to respective ones of said plurality of input ports;

each adaptation cell circuit of said plurality of adaptation cells including a respective variable feedback loop variation of which varies said output signal from said sensor element, and an externally-controllable multi-position switch varying said feedback loop in dependence upon the position of said switch.

16. The photoconductive infrared sensor of claim 15 wherein said variable feedback loop includes a low-pass filter which is switched into said feedback loop in a selected position of said multi-position switch.

17. The photoconductive infrared sensor of claim 15 wherein said variable feedback loop includes a conductor extending externally of said sensor element to receive an external reference signal, and in a selected position of said multi-position switch said external reference signal being switched into said feedback loop.

18. The photoconductive infrared sensor of claim 15 wherein said variable feedback loop includes a resistor, a first transistor and a capacitor in mutually parallel connection between a source of bias current and a photoconductive element of said sensor, said resistor, first transistor, and capacitor in parallel connection being further in series connection with a second transistor, and said resistor providing a voltage drop signal which is supplied to a gate of said first transistor via said multi-position switch.

19. The photoconductive infrared sensor of claim 15 wherein said adaptation circuit further includes a virtual capacitor for storing a reference voltage charge, said multi-position switch further having an open position in which charge conducted to said virtual capacitor during a preceding interval of switch closure in trapped on said virtual capacitor.

* * * * *